Aug. 4, 1931.  M. K. VINTHER  1,817,726
METHOD FOR PRODUCING HYDROGEN AND APPARATUS THEREFOR
Filed Aug. 6, 1929
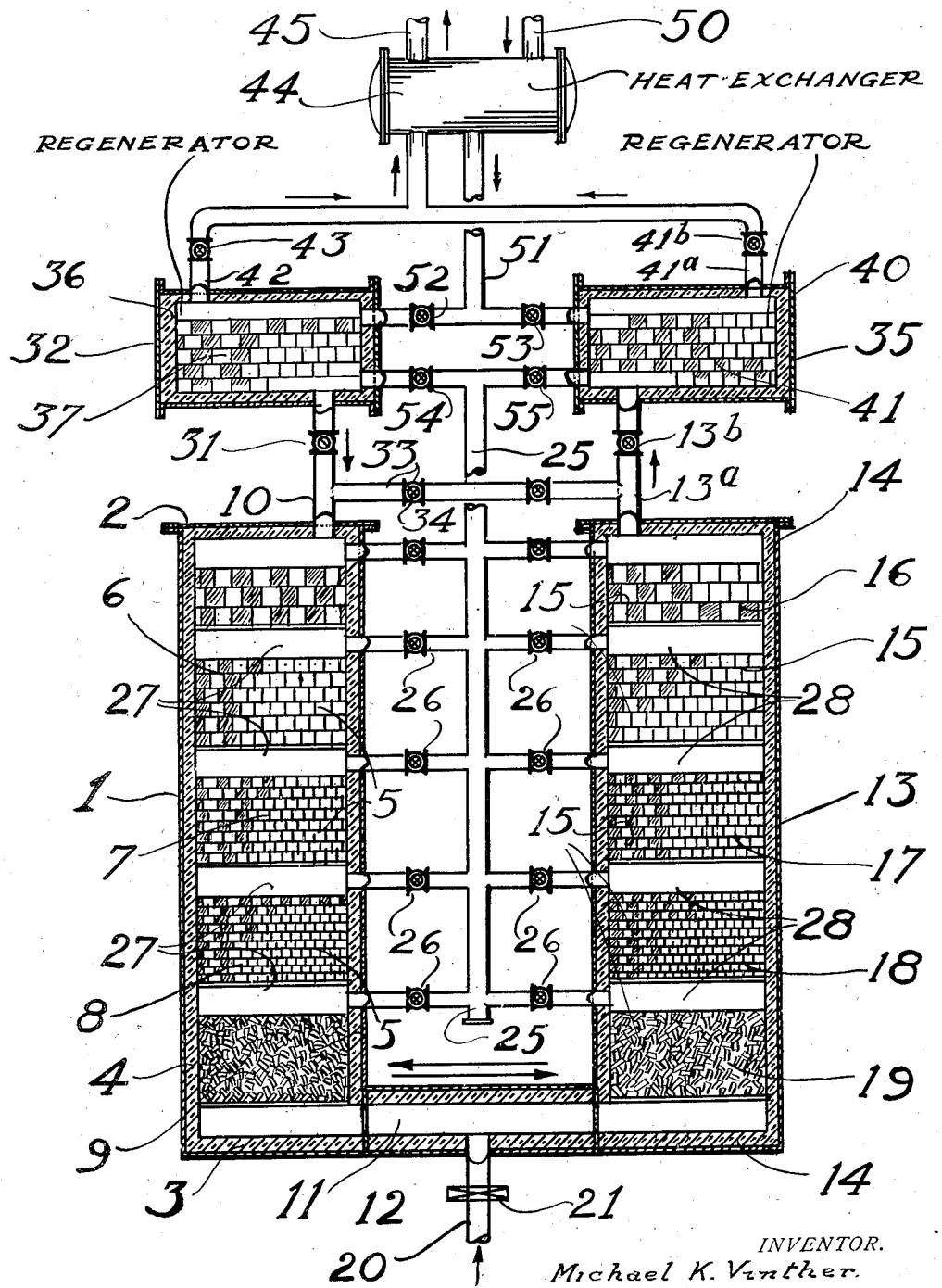
INVENTOR.
Michael K. Vinther.
BY Louis Burgess
ATTORNEY.

Patented Aug. 4, 1931

1,817,726

UNITED STATES PATENT OFFICE

MICHAEL K. VINTHER, OF NEWARK, NEW JERSEY

METHOD FOR PRODUCING HYDROGEN AND APPARATUS THEREFOR

Application filed August 6, 1929. Serial No. 383,948.

This invention relates to the production of hydrogen by the pyrolitic decomposition of hydrocarbon, and will be fully understood from the following description read in conjunction with the drawing, in which:

Fig. 1 is a diagrammatic plan partly in section of apparatus in which my invention may be carried into effect.

In the drawing, 1 denotes a receptacle having top and bottom closures 2 and 3 respectively. The receptacle is provided with a refractory lining 4, and with a filling of refractory material 5, which is laid to form continuous tortuous gas passages between the top and bottom, respectively of the receptacle. This filling comprises a section 6, adjacent the upper part of 1, in which the space between the individual blocks of refractory material is relatively large. A section 7 succeeds section 6 in which the blocks are more closely spaced and in any selected unit of volume present a greater surface than section 6. This is in turn succeeded by section 8 in which the blocks of refractory material are smaller and more closely spaced to present a greater surface in any selected unit of volume than section 7.

Section 9 is composed of closely packed fragments of refractory material which present a still greater surface in any selected unit of volume than section 8.

With the particular arrangement described, the hydrocarbon to be decomposed is introduced adjacent the upper part of the receptacle 1, through pipe 10, and travels in a general downwardly direction in receptacle 1. The decomposition of this hydrocarbon to produce hydrogen is rapid at first and tends to fall off in velocity as the reaction proceeds.

In order to increase the amount of hydrogen, formed in commercial operation, and to increase the production per unit of time, I find it advisable to increase the surface of the refractory material progressively in the general direction of flow of the hydrocarbon. In this way, the effect of the refractory surface tends to speed up the reaction and to diminish the time required for the production of the desired end product. While I find it of specific advantage to introduce the hydrocarbon adjacent the upper part of the receptacle, it will of course be understood that I may alternatively introduce it at the bottom or at any other selected point. In the event the hydrocarbon is introduced adjacent the bottom of the receptacle, the surface of refractory material presented to the gaseous hydrocarbon in any unit of volume will increase progressively as the upper part of the receptacle is approached.

Receptacle 1 communicates through duct 11, lined with refractory material 12, with the receptacle 13 which is of similar construction having the refractory lining 14, and the refractory filling 15 which is divided into different zones 16, 17, 18 and 19, in which the surface of the refractory filling in any selected unit of volume increases progressively as the bottom of the receptacle is approached. Receptacle 13 has a discharge pipe 13a controlled by valve 13b adjacent the upper part thereof.

It will be understood, that where exceptionally high temperatures are encountered, valves of special construction, for instance sand valves, will be employed and that the refractory materials must be selected with regard to the service and temperatures of operation. I further find it preferable to employ a refractory material substantially free from oxides of iron.

A fuel such as natural gas may be supplied to the receptacles 1 and 13, by means of pipe 20, controlled by the valve 21. Air may be supplied by means of branched pipe 25, controlled by valves 26. The branches of 25 communicate with the receptacles 1 and 13 at a number of points which are spaced apart and preferably communicate with open spaces such as 27 and 28. These spaces span the receptacle between the internal limits of the refractory linings 4 and 14, and while some vertical members must ordinarily be provided to support the super-incumbent brick work, the open spaces provide practically unobstructed openings spanning the receptacles to facilitate mixing of the introduced air with the materials in the receptacles.

The receptacle 1 discharges through the pipe 10, controlled by valve 31 into the regenerator 32, or alternatively by means of pipe 33, controlled by valve 34, discharged into regenerator 35. The regenerator 32 may be of any suitable type, and preferably includes a refractory lining 36 and a filling of refractory bricks 37, presenting continuous tortuous gas passages. The regenerator 35 is of similar construction comprising the refractory lining 40, and the refractory filling 41. The regenerator 32 discharges through the pipe 42, controlled by valve 43, into the heat exchanger 44, which in turn discharges through the pipe 45. The exchanger 44 may be of any suitable type which includes provision for conducting substances in indirect (preferably counter-current) heat exchanging relationship. The substance to be preheated is introduced through the pipe 50 and after passing through the exchanger 44 is conducted by means of pipe 51, controlled by valves 52 and 53 into either one of the regenerators 32 and 35. Provision is made for taking material from either of these regenerators and passing it into pipe 25, the flow into pipe 25 being controlled by valves 54 and 55. Regenerator 40 discharges into heat exchanger 44 through pipe 41a, controlled by valve 41b.

The method of operating the apparatus is substantially as follows:

A fuel such as natural gas is introduced through the pipe 20, and being suitably ignited is burnt by means of air introduced through the pipe 25. During this stage, the general movement of gases will be downward in one receptacle and upward in the connected receptacle, and the products of combustion may, for example, escape from receptacle 13 through the pipe 13a, controlled by the valve 13b, and passed through the regenerator 35, and heat exchanger 44. The incoming air may be introduced through pipe 50, and after passing through pipe 51 and regenerator 32, will be distributed from pipe 25. After heating receptacle 13 for a while, it will ordinarily be found convenient to reverse the direction of flow and to heat receptacle 1 while passing air in a general downwardly direction through receptacle 13, so that it becomes preheated and causes the attainment of higher temperature in 1 than was obtained in receptacle 13. During this cycle, the products of combustion escape through the regenerator 32, while the incoming air may, if desired, be preheated in regenerator 35.

After a few successive heatings of the receptacles, one receptacle, for example receptacle 1, will have become sufficiently hot to decompose the hydrocarbon material with the production of hydrogen. For this purpose a temperature of 1200° C. or higher is required and preferably 1400° C. or higher. At this stage, the air supply is discontinued and the hydrocarbon is introduced. I may for this purpose employ hydrocarbons which are normally solid or liquid, although I preferably operate with hydrocarbons which are normally gaseous, such as those principally present in natural gas. I may operate with materials consisting principally of hydrocarbons such as coke oven gas, and will comprehend all such materials by the use of the term "hydrocarbon." These hydrocarbons are introduced through pipe 50, and passed through pipe 51, into regenerator 32, thereby becoming preheated. The amount of preheat which may be communicated, varies with the stability of the hydrocarbons. Methane, for example, which does not readily decompose, may be preheated at temperatures of about 1000° C. The preheated methane passes through pipe 10, into the receptacle 1, and in contact with the refractory material in 1, which has been heated to temperatures in excess of 1200° C. and preferably in excess of 1400° C. is decomposed with the formation of hydrogen and carbon.

The gas velocities are preferably so controlled that the major part of the carbon produced is deposited in situ on the refractory material, and the hydrogen produced passes off through duct 11 and in an upwardly direction through receptacle 13, pipe 13a, regenerator 35, and out of the system through heat exchanger 44. Whenever the production of hydrogen begins to fall off, the supply of hydrocarbon is discontinued and air is introduced through pipe 50, passing through heat exchanger 44, through regenerator 32 or 35, and is then introduced through pipe 25 to the receptacles 1 and 13. Part of the air is introduced to the receptacle in which the carbon has been deposited, and produces therein a combustible gas.

This gas consists in large measure of carbon monoxide, inasmuch as it contains air in chemical equilibrium with the solid phase carbon, and will be hereinafter referred to generically as a combustible gas. So long as ample carbon is present and the temperature in the receptacle is up to 1000° C. or higher, the oxygen content of the air will be practically quantitatively converted into carbon monoxide. The air way may, if desired, be enriched by preliminarily adding oxygen.

The combustible gas generated in this manner passes through duct 11, into the connected receptacle, for example, 13, in which additional air is introduced to complete the combustion and utilize substantially all of the thermal value of the carbon which was deposited in receptacle 1. The products of combustion escape through the pipe 13a, and may be conducted through regenerator 32 or 35 before being discharged from the system from the heat exchanger 44.

I may operate the regenerators 32 and 35 in any desired manner so that the material, air, or hydrocarbon supplied to the apparatus passes through the regenerator which was heated during the preceding cycle of operations; but in my preferred method of operation the same regenerator is continued in operation during two successive cycles, for example, one regenerator will be heated by the hydrogen produced and the same regenerator will be thereafter carried to a still higher temperature by the combustion products evolved during the oxidation cycle. This regenerator will then be utilized to preheat the hydrocarbon during the third cycle and without interruption to preheat the air during the fourth cycle. During the third and fourth cycles, the alternative regenerator will be gradually rising in temperature, inasmuch as it first carries the hydrogen produced and thereafter the combustion products which are generated during the third and fourth cycles.

The process will then be reversed and the last mentioned regenerator utilized to preheat hydrocarbon and air during the fifth and sixth cycles.

While I have illustrated a specific embodiment of apparatus and a specific method of employing this apparatus in accordance with my invention, it will be understood that the specific description is intended by way of illustration and not of limitation. It is my desire that the invention be limited only by the appended claims or their equivalents, in which I have endeavored to claim broadly all inherent novelty.

I claim:

1. The process of repetitiously producing a gas, consisting predominantly of hydrogen, which comprises contacting a hydrocarbon with a first zone of refractory material maintained at a temperature producing hydrogen by thermal decomposition of said hydrocarbon, and producing deposition of carbon in said first zone, discontinuing the supply of hydrocarbon, contacting the said first zone with air producing a combustible gas, supplying said combustible gas to a second zone of refractory material, adding air to said second zone to complete combustion of said combustible gas, discontinuing the supply of air to said first and second zones, and contacting a hydrocarbon gas with said second zone of refractory material, producing hydrogen by thermal decomposition and deposition of carbon in said second zone.

2. Process according to claim 1, in which the air is supplied to said first and second zones in a plurality of spaced streams.

3. Process according to claim 1, in which the air supplied to said first and second zones is preheated.

4. Process according to claim 1, in which the hydrocarbon and air supplied to first and second zones are preheated.

5. The process of repetitiously producing a gas, consisting predominantly of hydrogen, which comprises contacting a hydrocarbon gas with a first zone of refractory material at a temperature producing hydrogen by thermal decomposition, and producing deposition of carbon in said first zone, conducting the hydrogen produced through a regenerator, discontinuing the supply of hydrocarbon, contacting the said first zone with air producing a combustible gas, supplying said combustible gas to a second zone of refractory material, adding air to said second zone to complete combustion of said combustible gas, conducting the products of complete combustion from said second zone through said regenerator, discontinuing the supply of air to said first and second zones, and conducting a hydrocarbon through the said regenerator and into the said second zone of refractory material producing hydrogen by thermal decomposition, and deposition of carbon in said second zone.

6. Process of producing a gas, consisting predominantly of hydrogen, which comprises contacting a hydrocarbon gas with refractory material at a temperature producing hydrogen by thermal decomposition, and producing deposition of carbon in said refractory material, the surface presented by the said refractory material per unit of volume increasing progressively in the general direction of flow.

7. The process of repetitiously producing a gas, consisting predominantly of hydrogen, which comprises heating a zone of refractory material to a temperature producing hydrogen by thermal decomposition, and conducting a hydrocarbon undergoing decomposition in a general downwardly direction through said zone of refractory material, in contact with refractory material the surface of which per unit of volume increases progressively as the lower part of the receptacle is approached.

MICHAEL K. VINTHER.